United States Patent
Nonaka (10) Patent No.: US 9,352,663 B2
(45) Date of Patent: May 31, 2016

(54) ELECTRIC POWER SUPPLY DEVICE

(75) Inventor: Tomonori Nonaka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 189 days.

(21) Appl. No.: 14/008,158

(22) PCT Filed: Mar. 27, 2012

(86) PCT No.: PCT/JP2012/002108
§ 371 (c)(1),
(2), (4) Date: Sep. 27, 2013

(87) PCT Pub. No.: WO2012/132404
PCT Pub. Date: Oct. 4, 2012

(65) Prior Publication Data
US 2014/0015481 A1 Jan. 16, 2014

(30) Foreign Application Priority Data

Mar. 31, 2011 (JP) .................................. 2011-078238

(51) Int. Cl.
| B60L 11/00 | (2006.01) |
| B60L 11/18 | (2006.01) |
| B60R 25/30 | (2013.01) |

(52) U.S. Cl.
CPC ........... B60L 11/1846 (2013.01); B60R 25/307 (2013.01); B60L 11/1824 (2013.01);
(Continued)

(58) Field of Classification Search
CPC ............ B60L 11/1846; B60L 11/1824; B60L 11/1861; B60L 11/1816
USPC ........................................................ 320/109
See application file for complete search history.

(56) References Cited

U.S. PATENT DOCUMENTS 6,984,961 B2 * 1/2006 Kadouchi et al. ............. 320/132
2008/0281663 A1 * 11/2008 Hakim et al. ..................... 705/8
(Continued)

FOREIGN PATENT DOCUMENTS

| EP | 2 109 203 A2 | 10/2009 |
| JP | 2009-171642 A | 7/2009 |

(Continued)

OTHER PUBLICATIONS

Extended European Search Report for Application No. 12764906.9 dated Aug. 5, 2015.
(Continued)

Primary Examiner — Samuel Berhanu
Assistant Examiner — Tarikh Rankine
(74) Attorney, Agent, or Firm — Pearne & Gordon LLP (57) ABSTRACT

Provided is an electric power supply device that supplies electric energy from the outside of a vehicle (10) to the vehicle (10). A PLC unit (202) acquires from the vehicle (10) the unique information (vehicle unique information) of the vehicle (10) stored in the vehicle (10). A server communication unit (203) acquires, from a server (30) for comparing the vehicle unique information with stolen vehicle information, the compared result. When the vehicle unique information does not match the stolen vehicle information, a control unit (206) allows the electric energy to be supplied from a power output unit (204) to the vehicle (10). In contrast, when the vehicle unique information matches the stolen vehicle information, the control unit (206) allows the electric energy stored in a battery (106) mounted on the vehicle (10) to be discharged from the battery (106) and dissipated by a power consuming unit (207).

7 Claims, 8 Drawing Sheets

(52) U.S. Cl.
CPC .......... *B60L2270/36* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2009/0224724 A1* | 9/2009 | Ma et al. | 320/109 |
| 2009/0313098 A1* | 12/2009 | Hafner et al. | 705/14.1 |
| 2010/0010698 A1 | 1/2010 | Iwashita et al. | |
| 2011/0302078 A1* | 12/2011 | Failing | 705/39 |

FOREIGN PATENT DOCUMENTS

| | | |
|---|---|---|
| JP | 2010-134566 A | 6/2010 |
| JP | 2011-227557 A | 11/2011 |

OTHER PUBLICATIONS

International Search Report for PCT/JP2012/002108 dated Jun. 19, 2012.

* cited by examiner

ELECTRIC POWER SUPPLY DEVICE

TECHNICAL FIELD

The present invention relates to an electric supply apparatus supplying electric energy to a vehicle including a storage battery, from the outside of the vehicle.

BACKGROUND ART

Some conventional electric supply apparatuses are configured to receive unique information on vehicles through power lines, to check the unique information against stolen-vehicle information, and to stop supplying power to the vehicle when the unique information coincides with the stolen-vehicle information (for example, refer to Patent Literature (hereinafter, abbreviated as PTL) 1).

CITATION LIST

Patent Literature

PTL 1
Japanese Patent Application Laid-Open No. 2010-134566

SUMMARY OF INVENTION

Technical Problem

However, even if the conventional electric supply apparatus (PTL 1) stops supplying power to the stolen vehicle as described above, the stolen vehicle can run for a considerable distance when sufficient electric energy is accumulated in the storage battery of the stolen vehicle. Therefore, even if the above-described conventional electric supply apparatus is used, it may be difficult to find the stolen vehicle. Thus, the use of the above-described conventional electric supply apparatus is not fully effective in reducing theft.

It is an object of the present invention to provide an electric supply apparatus that makes it easier to find a stolen vehicle and that makes it possible to enhance the effect of reducing theft.

Solution to Problem

An electric supply apparatus according to an aspect of the present invention supplies electric energy to a vehicle from outside of the vehicle, the apparatus including: an electric power output section that serves as a supply source of electric energy; a reception section that receives electric energy; a first communication section that communicates with the vehicle and acquires unique information from the vehicle, the unique information being stored in the vehicle and uniquely identifying the vehicle; a second communication section that communicates with a server configured to check the unique information against stolen-vehicle information and that acquires a checking result from the server; and a control section that supplies electric energy from the electric power output section to the vehicle when the unique information does not coincide with any piece of the stolen-vehicle information in the checking result, and when the unique information coincides with any one piece of the stolen-vehicle information in the checking result, the control section discharges electric energy accumulated in a storage battery included in the vehicle, from the storage battery, and causes the reception section to receive the electric energy.

Advantageous Effects of Invention

According to the present invention, a stolen vehicle can be easily found, and the effect of reducing theft can be enhanced.

DESCRIPTION OF EMBODIMENTS

The embodiments of the present invention will be described with reference to the accompanying drawings.

(Embodiment 1)

Figure 1:
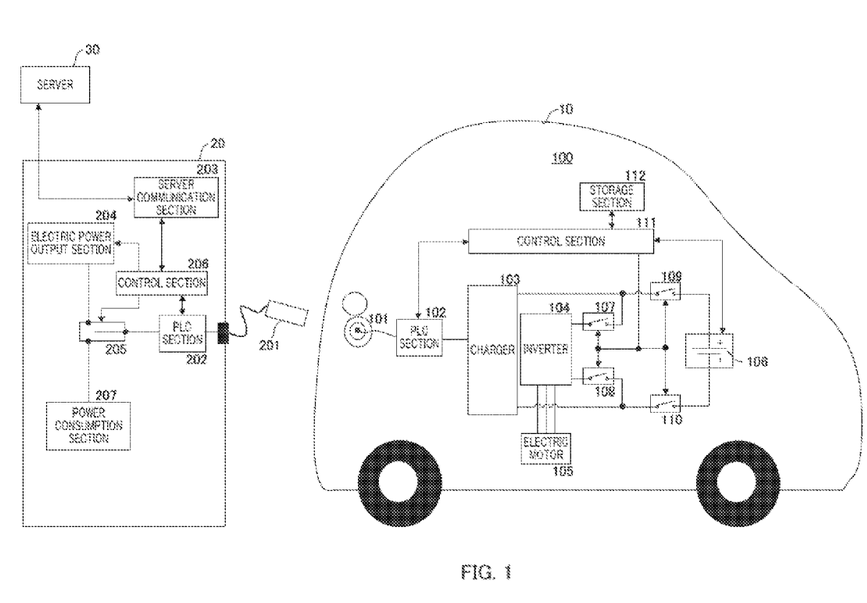
FIG. 1 is a block diagram illustrating a configuration of an electric supply apparatus and a vehicular electric source apparatus according to Embodiment 1 of the present invention.

As illustrated in FIG. 1, electric supply apparatus 20 is connected to server 30. Server 30 stores stolen-vehicle information on each of a plurality of stolen vehicles as a stolen-vehicle database. Electric supply apparatus 20 supplies electric energy to vehicle 10 from the outside of vehicle 10. Electric supply apparatus 20 additionally supplies electric energy to vehicle 10 through an electric power supply line.

As illustrated in FIG. 1, electric supply apparatus 20 includes electric supply plug 201, PLC (Power Line Communications) section 202, server communication section 203, electric power output section 204, selector switch 205, control section 206, and power consumption section 207.

Electric supply apparatus 20 supplies electric energy to vehicle 10 from electric power output section 204 through selector switch 205, PLC section 202, and electric supply plug 201, and consumes electric energy (electric discharge energy) discharged from storage battery 106 included in vehicle 10, using power consumption section 207.

PLC section 202 performs power line communication with PLC section 102 through electric supply plug 201, lid portion 101, and the electric power supply line of vehicle 10. PLC section 202 acquires unique information (vehicle unique information) uniquely identifying vehicle 10 from vehicle 10 through this power line communication, outputs the resultant information to control section 206, and also transmits a charge/discharge start signal generated by control section 206, to vehicle 10. The vehicle unique information is inputted to server communication section 203 through control section 206.

Server communication section 203 communicates with server 30 and transmits the vehicle unique information to server 30. Server communication section 203 also acquires a checking result in server 30 and outputs the result to control section 206.

Server 30 checks the vehicle unique information received from server communication section 203 against each piece of stolen-vehicle information in the stolen-vehicle database, and transmits a checking result of whether the vehicle unique information coincides with any piece of the stolen-vehicle information, to server communication section 203. The checking result is inputted to control section 206 through server communication section 203.

Here, the vehicle unique information and stolen-vehicle information may be information that can uniquely identify each vehicle, such as a frame number, the registration number of a vehicle, or a specific vehicle ID.

Electric power output section 204 is a supply source (electric source) of electric energy supplied to vehicle 10. When electric supply apparatus 20 is installed in a standard home, electric power output section 204 is a home electric source and outputs, for example, AC electric energy of approximately 100 to 240V. When electric supply apparatus 20 is installed as a charge stand, electric power output section 204 outputs, for example, DC electric energy of approximately 400V. An output control on electric energy from electric power output section 204 (whether to output electric energy) is performed by control section 206.

Power consumption section 207 receives and consumes electric discharge energy. Power consumption section 207 is, for example, a resistance having high impedance. As described above, the present embodiment includes power consumption section 207 serving as a receiver of electric discharge energy.

Control section 206 controls selector switch 205 and electric power output section 204 according to the checking result inputted from server communication section 203.

That is, when the vehicle unique information does not coincide with any piece of the stolen-vehicle information, control section 206 connects selector switch 205 to electric power output section 204 to connect electric power output section 204 and electric supply plug 201 through PLC section 202, and outputs electric energy from electric power output section 204. Thereby, control section 206 supplies electric energy to vehicle 10 from electric power output section 204 through selector switch 205, PLC section 202, and electric supply plug 201. On the other hand, when the vehicle unique information coincides with any one piece of the stolen-vehicle information, control section 206 connects selector switch 205 to power consumption section 207 to connect electric supply plug 201 and power consumption section 207 through PLC section 202, and does not output electric energy from electric power output section 204. Thereby, control section 206 causes power consumption section 207 to receive and consume electric discharge energy.

As shown in FIG. 1, vehicular electric source apparatus 100 is installed in vehicle 10. Vehicular electric source apparatus 100 includes lid portion 101, PLC section 102, charger 103, inverter 104, electric motor 105, storage battery 106, relays 107 to 110, control section 111, and storage section 112.

In vehicular electric source apparatus 100, electric supply plug 201 is inserted at an electrode provided in lid portion 101, from the outside of vehicle 10. Thereby, vehicular electric source apparatus 100 can receive supply of electric energy from electric supply apparatus 20 to accumulate this electric energy in storage battery 106, and also transmit electric discharge energy to electric supply apparatus 20. Vehicular electric source apparatus 100 can also perform power line communication with electric supply apparatus 20 by inserting electric supply plug 201 at the electrode provided in lid portion 101 from the outside of vehicle 10.

Lid portion 101 can be attached/detached or opened/closed by the user of vehicle 10. The user of vehicle 10 inserts electric supply plug 201 in lid portion 101 from the outside of vehicle 10 to perform charge for vehicle 10. Electric supply plug 201 is inserted at the electrode included in lid portion 101. Thereby, the electrode of electric supply plug 201 is contacted with the electrode of lid portion 101. This enables supply of electric energy from electric supply apparatus 20 to vehicle 10, transmission of electric discharge energy from vehicle 10 to electric supply apparatus 20, and power line communication with electric supply apparatus 20. Electric energy supplied from electric supply apparatus 20 is accumulated in storage battery 106 through PLC section 102, charger 103, and relays 109 and 110. On the other hand, electric discharge energy outputted from storage battery 106 is transmitted to electric supply apparatus 20 through relays 109 and 110, charger 103, PLC section 102, and lid portion 101.

PLC section 102 performs power line communication with PLC section 202 of electric supply apparatus 20 through lid portion 101 and electric supply plug 201. Thereby, PLC section 102 acquires a charge/discharge start signal from electric supply apparatus 20 to output the signal to control section 111, and also transmits vehicle unique information inputted from control section 111, to electric supply apparatus 20.

When AC electric energy is supplied from electric supply apparatus 20, charger 103 converts this AC electric energy in DC electric energy and outputs the resultant electric energy. On the other hand, when DC electric energy is supplied from electric supply apparatus 20, charger 103 outputs this DC electric energy without any processing. The DC electric energy outputted from charger 103 is accumulated in storage battery 106 through relays 109 and 110.

When electric supply apparatus 20 supplies AC electric energy, charger 103 converts DC electric discharge energy outputted from storage battery 106, in AC electric discharge energy, and outputs the converted electric discharge energy to electric supply apparatus 20 through PLC section 102 and lid portion 101. On the other hand, when electric supply apparatus 20 supplies DC electric energy, DC electric discharge energy outputted from storage battery 106 is outputted to electric supply apparatus 20 through PLC section 102 and lid portion 101 without processing.

The shaft of electric motor 105 is connected to the axle of the driving wheel of vehicle 10 to convert the kinetic energy of vehicle 10 in electric energy and generate regenerative braking force. When a rotor included in electric motor 105 is rotated by external force (rotational force of the axle of the driving wheel of vehicle 10), electric motor 105 generates electric energy as an electric generator. When kinetic energy due to rotation of the axle is converted in electric energy, electric motor 105 generates regenerative braking force as resistance force to rotations of the axle. Electric motor 105 outputs this electric energy to inverter 104. This electric energy is AC electric energy.

Inverter 104 converts the AC electric energy outputted by electric motor 105, in DC electric energy, and outputs the resultant electric energy. The converted DC electric energy is accumulated in storage battery 106 through relays 107 to 110.

When relays 107 and 108 are turned on by control section 111, inverter 104 is electrically connected to relays 109 and 110, respectively. On the other hand, when relays 107 and 108 are turned off by control section 111, inverter 104 is electrically disconnected from relays 109 and 110, respectively.

When relays 109 and 110 are turned on by control section 111, the relays electrically connect charger 103 to storage battery 106, and electrically connect relays 107 and 108 to storage battery 106. On the other hand, when relays 109 and 110 are turned off by control section 111, the relays electrically disconnect charger 103 from storage battery 106, and electrically disconnect relays 107 and 108 from storage battery 106.

Relays 107 and 109 are provided on the positive electrode side of storage battery 106. Relays 108 and 110 are provided on the negative electrode side of storage battery 106.

Storage battery 106 accumulates DC electric energy outputted by charger 103 and DC electric energy outputted by inverter 104. Storage battery 106 can also discharge the accumulated electric energy. Storage battery 106 can be provided by using a secondary battery having a high energy density (for example, a nickel hydrogen battery or a lithium ion battery) or a capacitor having a large capacitance.

Storage section 112 stores vehicle unique information.

Control section 111 acquires the vehicle unique information stored in storage section 112, and transmits the acquired vehicle unique information from PLC section 102 to electric supply apparatus 20.

Control section 111 monitors the state of charge (SOC) of storage battery 106.

Control section 111 controls turning on/off of relays 107 to 110. When vehicle 10 can run, control section 111 turns on all relays 107 to 110. When vehicle 10 cannot run and no charge/discharge start signal is inputted from PLC section 102, control section 111 turns off all relays 107 to 110. When vehicle 10 cannot run and a charge/discharge start signal is inputted from PLC section 102, control section 111 turns off relays 107 and 108 and turns on relays 109 and 110.

Next, a processing flow of a charge/discharge process according to the present embodiment will be described with reference to FIG. 2.

Figure 2:
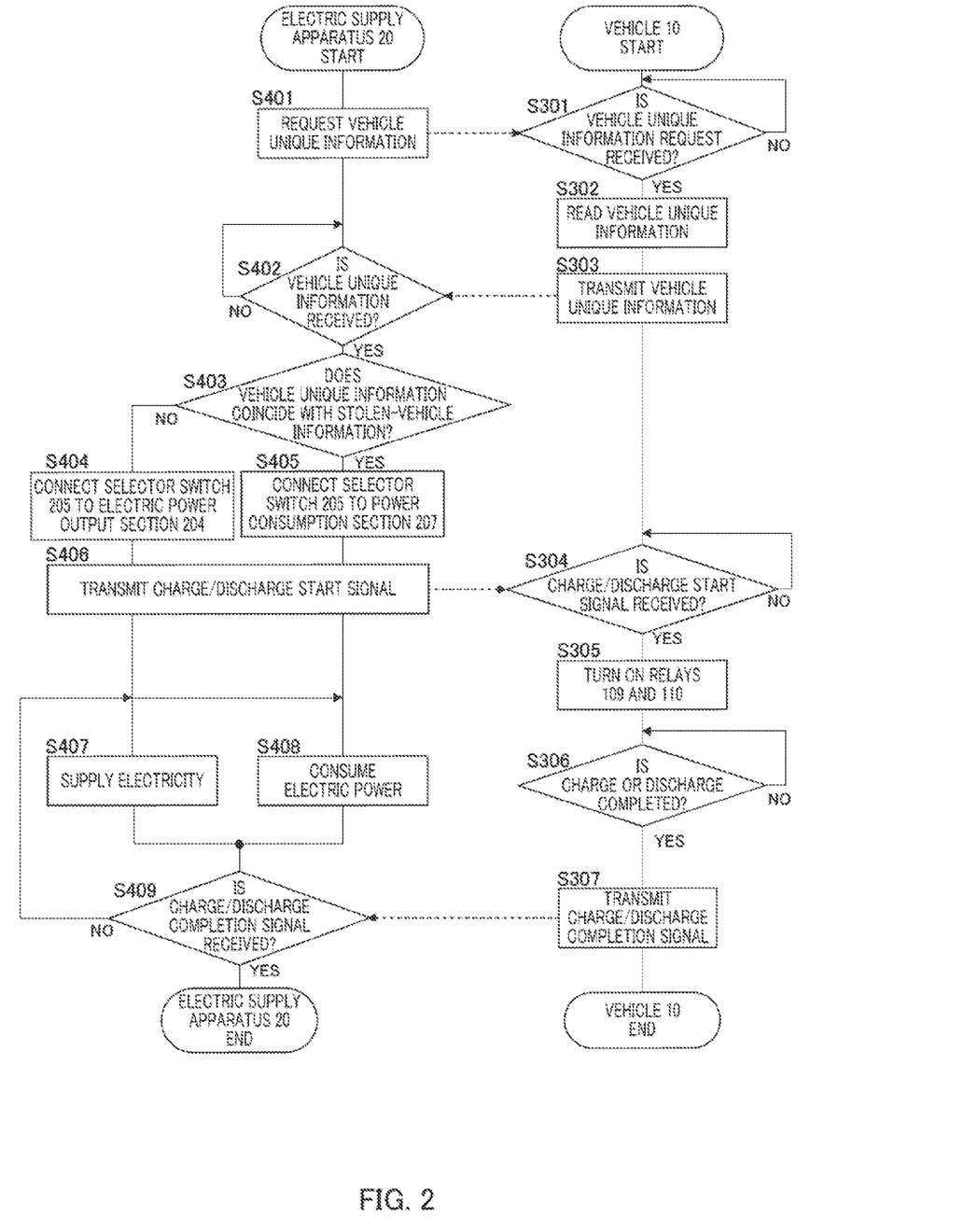
FIG. 2 is a processing flowchart of a charge/discharge process according to Embodiment 1 of the present invention.

At the start of the charge/discharge process illustrated in FIG. 2, electric supply plug 201 is inserted at the electrode included in lid portion 101. In this state, the electrode of electric supply plug 201 is in contact with the electrode of lid portion 101. That is, in this state, PLC section 202 of electric supply apparatus 20 can communicate with PLC section 102 of vehicle 10. Additionally, in this state, vehicle 10 cannot run, and all relays 107 to 110 are turned off by control section 111.

First, in S401 of FIG. 2, control section 206 of electric supply apparatus 20 requests vehicle unique information from vehicle 10. Control section 206 generates a vehicle unique information request, and PLC section 202 transmits the vehicle unique information request to vehicle 10.

PLC section 102 of vehicle 10 waits for reception of the vehicle unique information request in S301 (S301: NO). If receiving the vehicle unique information request (S301: YES), PLC section 102 outputs the received vehicle unique information request to control section 111. Control section 111 reads vehicle unique information from storage section 112 in response to the vehicle unique information request (S302), and PLC section 102 transmits the vehicle unique information to electric supply apparatus 20 (S303).

In S402, PLC section 202 of electric supply apparatus 20 waits for reception of the vehicle unique information (S402: NO). If receiving the vehicle unique information (S402: YES), PLC section 202 outputs the received vehicle unique information to control section 206. The vehicle unique information is inputted to server communication section 203 through control section 206. Server communication section 203 communicates with server 30 and transmits the vehicle unique information to server 30. Server 30 checks the vehicle unique information received from server communication section 203 against each piece of the stolen-vehicle information in the stolen-vehicle database, and transmits the checking result to server communication section 203. The checking result is inputted to control section 206 through server communication section 203.

In S403, control section 206 of electric supply apparatus 20 judges the checking result inputted from server communication section 203.

When the vehicle unique information does not coincide with any piece of the stolen-vehicle information, i.e., when vehicle 10 connected to electric supply apparatus 20 is not a stolen vehicle (S403: NO), control section 206 connects selector switch 205 to electric power output section 204 to connect electric power output section 204 and electric supply plug 201 through PLC section 202, and outputs electric energy from electric power output section 204 (S404). On the other hand, when the vehicle unique information coincides with any one piece of the stolen-vehicle information, i.e., when vehicle 10 connected to electric supply apparatus 20 is a stolen vehicle (S403: YES), control section 206 connects selector switch 205 to power consumption section 207 to connect electric supply plug 201 and power consumption section 207 through PLC section 202, and does not output electric energy from electric power output section 204 (S405).

Control section 206 generates a charge/discharge start signal after a process of S404 or S405, and PLC section 202 transmits the charge/discharge start signal to vehicle 10 (S406).

In S304, PLC section 102 of vehicle 10 waits for reception of the charge/discharge start signal (S304: NO). If receiving charge/discharge start signal (S304: YES), PLC section 102 outputs the received charge/discharge start signal to control section 111. Control section 111 turns on relays 109 and 110 in response to the charge/discharge start signal (S305).

Through the above process, when vehicle 10 connected to electric supply apparatus 20 is not a stolen vehicle (S403: NO), electric energy is supplied from electric power output section 204 of electric supply apparatus 20 to vehicle 10 and is accumulated in storage battery 106 of vehicle 10 to charge storage battery 106 (S407). On the other hand, when vehicle 10 connected to electric supply apparatus 20 is a stolen vehicle (S403: YES), electric energy is discharged from storage battery 106 of vehicle 10. The electric discharge energy outputted from storage battery 106 is then received and consumed by power consumption section 207 of electric supply apparatus 20 (S408).

In S306, control section 111 of vehicle 10 monitors the state of charge of storage battery 106 and waits for completion of charge or discharge (S306: NO). When the state of charge reaches an upper limit threshold by charging storage battery 106, or when the state of charge reaches a lower limit threshold by discharging storage battery 106, control section 111 judges that charge or discharge is completed (S306: YES), generates a charge/discharge completion signal, and turns off relays 109 and 110. PLC section 102 transmits the charge/discharge completion signal to electric supply apparatus 20 (S307).

Here, the lower limit threshold of the state of charge is set to the state of charge in which vehicle 10 cannot run, or the state of charge in which vehicle 10 can run for only a slight distance. Therefore, storage battery 106 is discharged to thereby disable vehicle 10 from running or enable running for only a slight distance.

In addition, the upper limit threshold of the state of charge may be set as a value smaller than 100% so as to prevent deterioration of storage battery 106 due to full charge. Moreover, the lower limit threshold of the state of charge may be set as a larger value than 0% so as to prevent storage battery 106 from becoming no longer reusable due to deterioration when storage battery 106 is fully discharged.

In S409, PLC section 202 of electric supply apparatus 20 waits for reception of the charge/discharge completion signal. While the charge/discharge completion signal is not received by PLC section 202 and is not inputted to control section 206 from PLC section 202 (S409: NO), a process of S407 or S408 is continued. On the other hand, when the charge/discharge completion signal is received by PLC section 202 and is inputted to control section 206 from PLC section 202, (S409: YES), control section 206 completes a process of S407 or S408. In other words, when receiving the charge/discharge completion signal during the process of S407, control section 206 stops the output of electric energy from electric power output section 204 and causes selector switch 205 to be connected to neither electric power output section 204 nor power consumption section 207. Moreover, when receiving the charge/discharge completion signal during the process of S408, control section 206 causes selector switch 205 to be connected to neither electric power output section 204 nor power consumption section 207.

Thus, according to the present embodiment, when vehicle 10 is a stolen vehicle, storage battery 106 of vehicle 10 is discharged to decrease the state of charge of storage battery 106 to such a level that vehicle 10 cannot run or the state of charge to which a vehicle 10 can run for only a slight distance. As a result, the stolen vehicle cannot run from electric supply apparatus 20 or can run for only a slight distance from electric supply apparatus 20. Therefore, according to the present embodiment, it is made easier to find the stolen vehicle. Moreover, the presence of electric supply apparatus 20 according to the present embodiment itself in public can enhance the effect of reducing theft.

In S408, control section 206 may further measure the amount of electric discharge energy consumed by power consumption section 207 and may output the measurement result to server communication section 203. In this case, server communication section 203 transmits the measurement result together with the vehicle unique information to server 30, and stores the measurement result and the vehicle unique information in association with each other in server 30. Thereby, when vehicle 10 that is a stolen vehicle is returned to the registered owner and then the owner charges vehicle 10 using electric supply apparatus 20, electric supply apparatus 20 can return, to the owner, the amount of electric discharge energy stored in server 30, i.e., the electric energy extracted from vehicle 10 during the theft.

(Embodiment 2)

Figure 3:
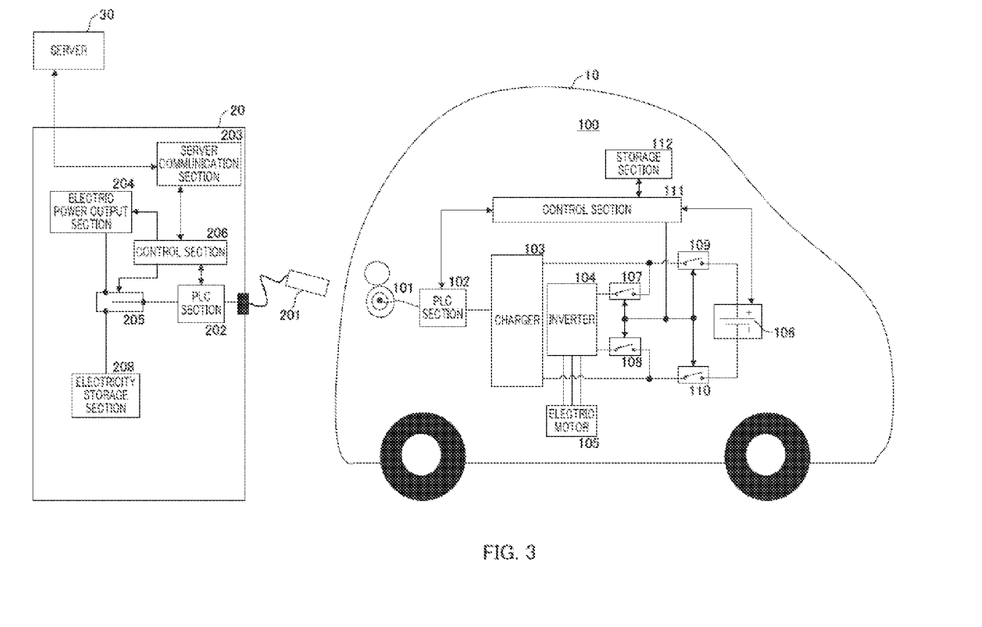
FIG. 3 is a block diagram illustrating a configuration of an electric supply apparatus and a vehicular electric source apparatus according to Embodiment 2 of the present invention.

As illustrated in FIG. 3, the present embodiment is different from Embodiment 1 (FIG. 1) in that the receiver of electric discharge energy is electricity storage section 208 instead of power consumption section 207. In FIG. 3, the same elements as those in FIG. 1 (Embodiment 1) are designated with the same reference numerals, and their redundant descriptions will be omitted. Hereinafter, only differences from Embodiment 1 will be described.

Electricity storage section 208 receives and accumulates electric discharge energy. Electricity storage section 208 is a storage battery or a capacitor, for example. As described above, the present embodiment includes electricity storage section 208 serving as a receiver of electric discharge energy.

Control section 206 controls selector switch 205 and electric power output section 204 according to the checking result inputted from server communication section 203.

That is, when the vehicle unique information does not coincide with any piece of the stolen-vehicle information, control section 206 connects selector switch 205 to electric power output section 204 to connect electric power output section 204 and electric supply plug 201 through PLC section 202, and outputs electric energy from electric power output section 204. Thereby, control section 206 supplies electric energy to vehicle 10 from electric power output section 204 through selector switch 205, PLC section 202, and electric supply plug 201. On the other hand, when the vehicle unique information coincides with any one piece of the stolen-vehicle information, control section 206 connects selector switch 205 to electricity storage section 208 to connect electric supply plug 201 and electricity storage section 208 through PLC section 202, and does not output electric energy from electric power output section 204. Thereby, control section 206 causes electricity storage section 208 to receive and accumulate electric discharge energy.

Figure 4:
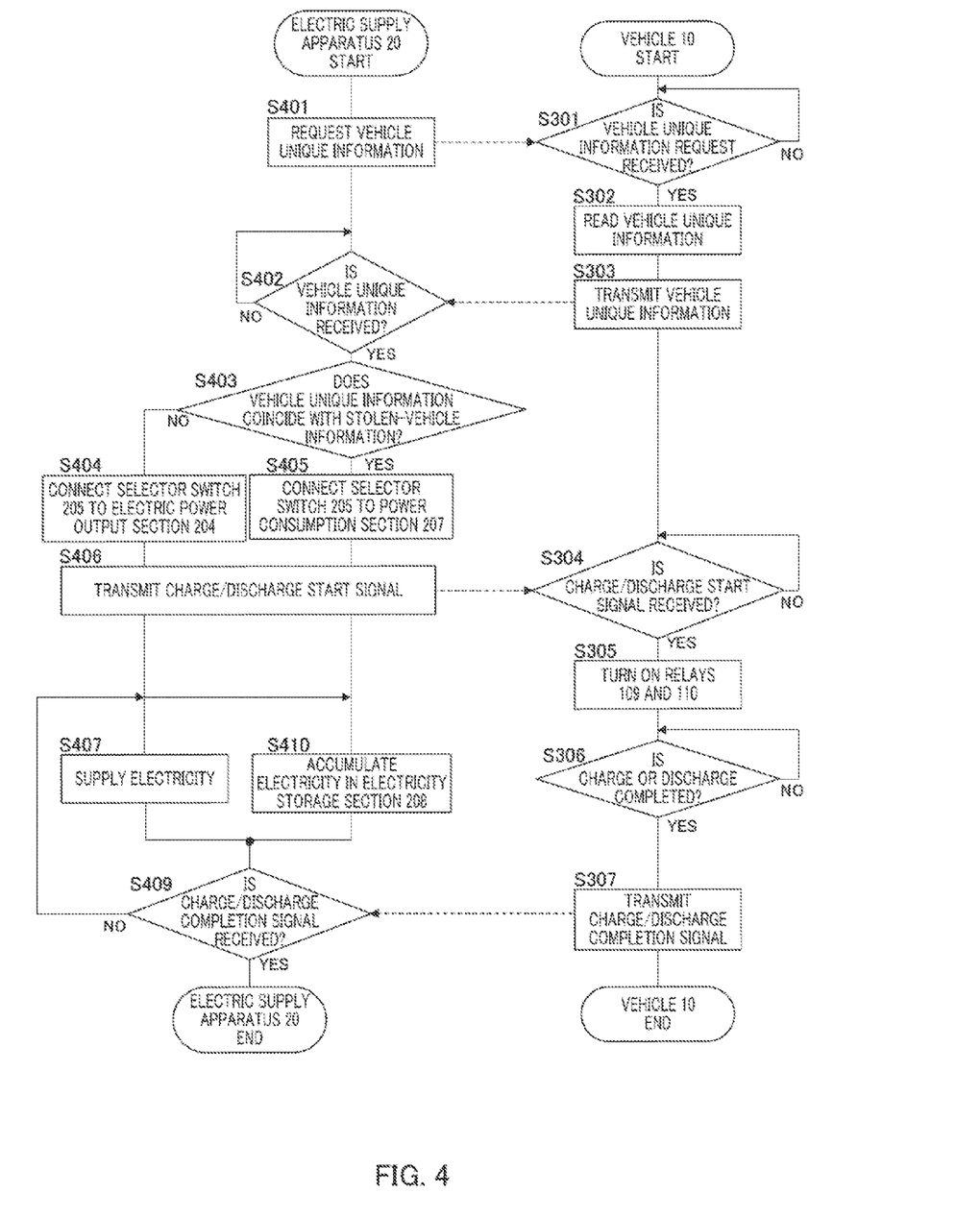
FIG. 4 is a processing flow diagram of a charge/discharge process according to Embodiment 2 of the present invention.

Next, a processing flow of a charge/discharge process according to the present embodiment will be described with reference to FIG. 4. As illustrated in FIG. 4, the present embodiment is different from Embodiment 1 (FIG. 2) in that a process of S410 is included instead of S408. In FIG. 4, the same steps as those in FIG. 2 (Embodiment 1) are designated with the same reference numerals, and their redundant descriptions will be omitted. Hereinafter, only differences from Embodiment 1 will be described.

When vehicle 10 connected to electric supply apparatus 20 is not a stolen vehicle (S403: NO), electric energy is supplied from electric power output section 204 of electric supply apparatus 20 to vehicle 10 and is accumulated in storage battery 106 of vehicle 10 to charge storage battery 106 (S407). On the other hand, when vehicle 10 connected to electric supply apparatus 20 is a stolen vehicle (S403: YES), electric energy is discharged from storage battery 106 of vehicle 10. The electric discharge energy outputted from storage battery 106 is then received and accumulated by electricity storage section 208 of electric supply apparatus 20 (S410).

As described above, the present embodiment includes electricity storage section 208 accumulating electric discharge energy and can therefore reuse the accumulated electric discharge energy.

In S410, control section 206 may further measure the amount of electric discharge energy accumulated from vehicle 10 in electricity storage section 208 and may output the measurement result to server communication section 203. In this case, server communication section 203 transmits the measurement result together with the vehicle unique information to server 30, associates the measurement result with the vehicle unique information, and stores the associated result in server 30. Thereby, when vehicle 10 that is a stolen vehicle is returned to the registered owner and then the owner charges vehicle 10 using electric supply apparatus 20, electric supply apparatus 20 can return, to the owner, the amount of electric discharge energy stored in server 30, i.e., the electric energy extracted from vehicle 10 during the theft.

(Embodiment 3)

Figure 5:
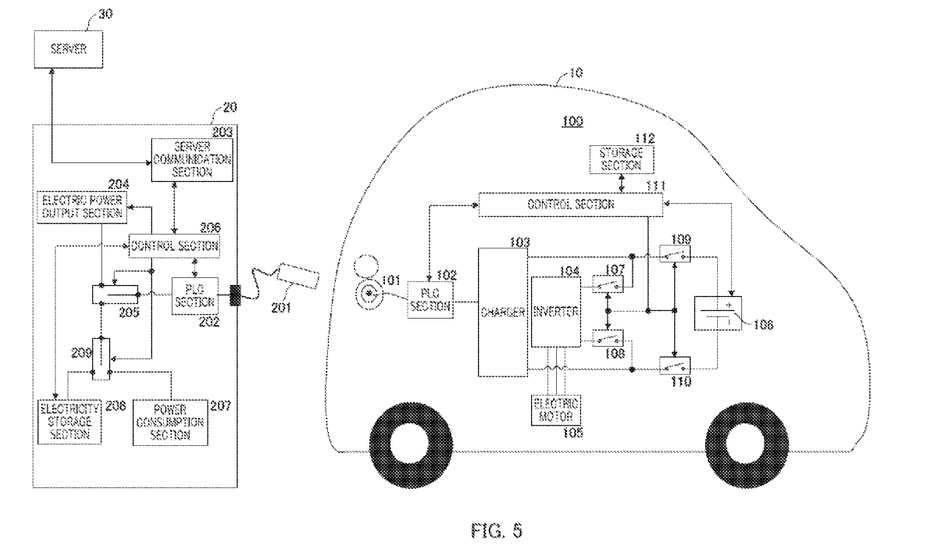
FIG. 5 is a block diagram illustrating a configuration of an electric supply apparatus and a vehicular electric source apparatus according to Embodiment 3 of the present invention.

As illustrated in FIG. 5, the present embodiment is a combination of Embodiment 1 and Embodiment 2. In FIG. 5, the same elements as those in FIG. 1 (Embodiment 1) or FIG. 3 (Embodiment 2) are designated with the same reference numerals, and their redundant descriptions will be omitted. Hereinafter, only differences from Embodiment 1 and Embodiment 2 will be described.

When the vehicle unique information coincides with any one piece of the stolen-vehicle information, control section 206 connects selector switch 205 to selector switch 209 to connect electric supply plug 201 and selector switch 209 through PLC section 202, and does not output electric energy from electric power output section 204.

Moreover, control section 206 monitors the state of charge of electricity storage section 208 and connects selector switch 209 to one of power consumption section 207 and electricity storage section 208 according to the state of charge.

Figure 6:
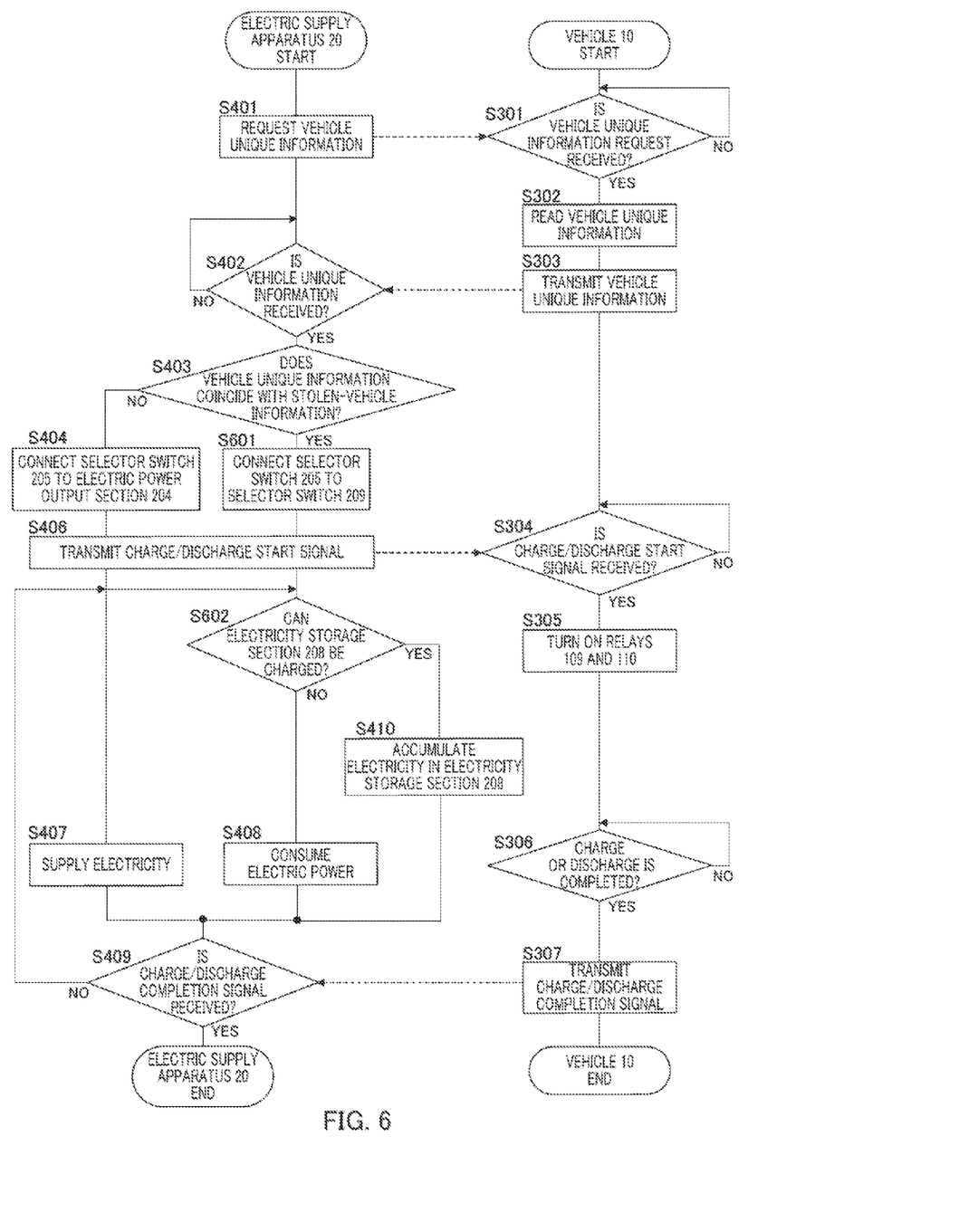
FIG. 6 is a processing flowchart of a charge/discharge process according to Embodiment 3 of the present invention.

Next, a process flow of a charge/discharge process according to the present embodiment will be described with reference to FIG. 6. As illustrated in FIG. 6, the present embodiment is different from Embodiment 1 (FIG. 2) and Embodiment 2 (FIG. 4) in that a process of S602 is newly included and a process of S601 is included instead of S405. In FIG. 6, the same steps as those in FIG. 2 (Embodiment 1) or FIG. 4 (Embodiment 2) are designated with the same reference numerals, and their redundant descriptions will be omitted. Hereinafter, only differences from Embodiment 1 and Embodiment 2 will be described.

When selector switch 205 is connected to selector switch 209 (S601), control section 206 judges whether electricity storage section 208 can be charged (S602).

When the state of charge of electricity storage section 208 is smaller than a threshold, control section 206 judges that electricity storage section 208 can be charged (S602: YES), and connects selector switch 209 to electricity storage section 208. Thereby, control section 206 causes electricity storage section 208 to receive and accumulate electric discharge energy (S410).

On the other hand, when the state of charge of electricity storage section 208 is equal to or more than the threshold, control section 206 judges that electricity storage section 208 cannot be charged (S602: NO), and connects selector switch 209 to power consumption section 207. Thereby, control section 206 causes power consumption section 207 to receive and consume electric discharge energy (S408).

Here, the threshold of the state of charge of electricity storage section 208 is set to the state of charge equivalent to the full charge of electricity storage section 208.

That is, when the state of charge of electricity storage section 208 is smaller than the threshold, control section 206 causes electricity storage section 208 to receive and accumulate electric discharge energy. Additionally, when the state of charge of electricity storage section 208 is equal to or more than the threshold, control section 206 causes power consumption section 207 to receive and consume electric discharge energy.

As described above, in the present embodiment, the receiver of electric discharge energy is determined to be either power consumption section 207 or electricity storage section 208 according to the state of charge of electricity storage section 208. Thereby, electric discharge energy accumulated in electricity storage section 208 is reusable. Additionally, even when electric discharge energy cannot be charged in electricity storage section 208, electric discharge from storage battery 106 included in vehicle 10 can be continued since power consumption section 207 is provided. Accordingly, the reusability of electric discharge energy can be enhanced, and a stolen vehicle can be easily found.

(Embodiment 4)

Figure 7:
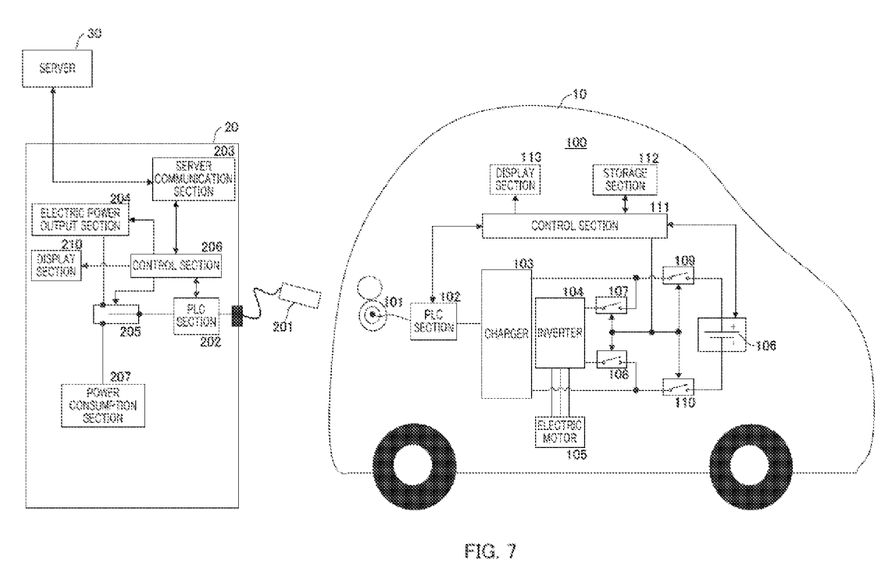
FIG. 7 is a block diagram illustrating a configuration of an electric supply apparatus and a vehicular electric source apparatus according to Embodiment 4 of the present invention.

As illustrated in FIG. 7, the present embodiment is different from Embodiment 1 (FIG. 1) in that electric supply apparatus 20 further includes display section 210 and vehicle 10 further includes display section 113. In FIG. 7, the same elements as those in FIG. 1 (Embodiment 1) are designated with the same reference numerals, and their redundant descriptions will be omitted. Hereinafter, only differences from Embodiment 1 will be described.

Figure 8:
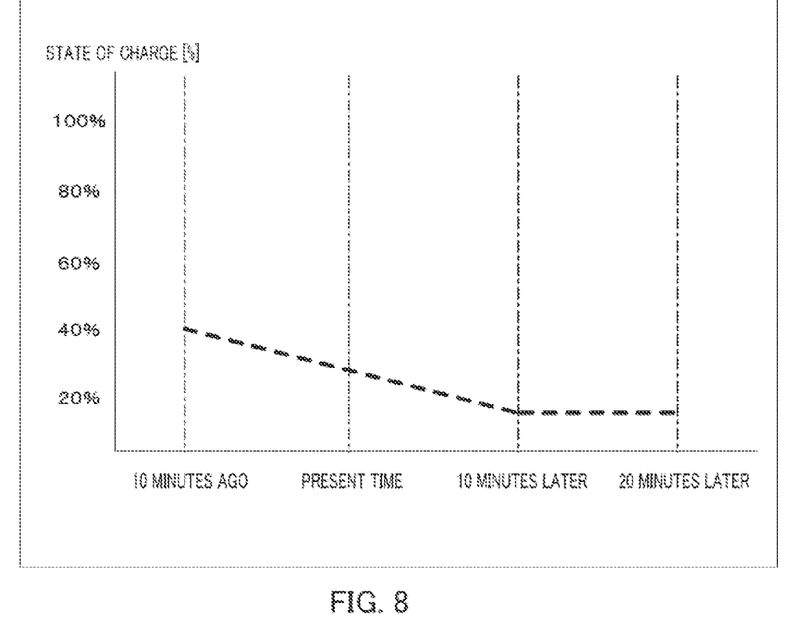
FIG. 8 is a graph illustrating a situation of charge according to Embodiment 4 of the present invention.

During discharge of storage battery 106 of vehicle 10, the state of charge of storage battery 106 gradually decreases with the passage of time, for example, as illustrated in FIG. 8. Here, even though the person who stole the vehicle intends to charge vehicle 10 with electric supply apparatus 20, if the person notices that electric energy is extracted from vehicle 10 by electric supply apparatus 20, the person may drive vehicle 10 and run away before the completion of electric discharge.

Figure 9:
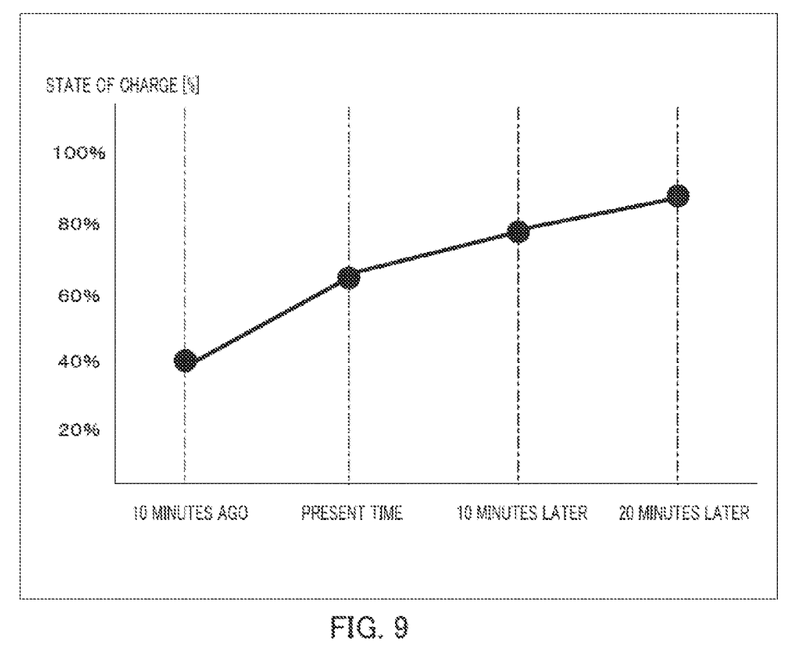
FIG. 9 is an example of an image display according to Embodiment 4 of the present invention.

Thus, in the present embodiment, when the vehicle unique information coincides with any one piece of the stolen-vehicle information, control section 206 of electric supply apparatus 20 displays on display section 210 a pseudo image as illustrated in FIG. 9 indicating that electric energy is accumulated in storage battery 106 of vehicle 10, although the state of charge of storage battery 106 is decreasing. This pseudo image pretends as if electric energy is gradually accumulated in storage battery 106 of vehicle 10 with the passage of time and the state of charge of storage battery 106 increases gradually with the passage of time. Furthermore, control section 206 may display on display section 113 of vehicle 10 the pseudo image illustrated in FIG. 9 through PLC section 202, electric supply plug 201, lid portion 101, PLC section 102, and control section 111.

In addition, electric supply apparatus 20 and vehicle 10 may include a voice output section outputting pseudo voice instead of the above-described display section displaying a pseudo image. That is, when the vehicle unique information coincides with any one piece of the stolen-vehicle information, control section 206 may output from the voice output section the pseudo voice indicating that electric energy is accumulated in storage battery 106, although the state of charge of storage battery 106 is decreasing. This pseudo voice indicates that the state of charge of storage battery 106 gradually increases with the passage of time.

That is, in the present embodiment, when the vehicle unique information coincides with any one piece of the stolen-vehicle information, control section 206 generates the pseudo image or the pseudo voice for a pseudo indication that electric energy is accumulated in storage battery 106, although the state of charge of storage battery 106 is decreasing.

In this way, the pseudo indication as illustrated in FIG. 9 is made in spite of extracting electric energy from vehicle 10. This can cause the person who stole the vehicle to believe that vehicle 10 is being charged. Therefore, the present embodiment can prevent the person who stole the vehicle from running away from electric supply apparatus 20 using vehicle 10 halfway through electric discharge.

Moreover, providing the person who stole the vehicle with the pseudo indication as illustrated in FIG. 9 and thus causing the person to believe that vehicle 10 is being charged makes the person stay near electric supply apparatus 20 for a longer time. Accordingly, the present embodiment can increase the probability of arresting the suspect.

In addition, when making the above-described pseudo indication, control section 206 may report that electric energy accumulated in storage battery 106 is discharged from storage battery 106, to server 30 through server communication section 203. In this way, by reporting, to server 30, that electric energy is discharged from storage battery 106, the person who stole the vehicle believe that vehicle 10 is being charged. During this period, information on the stolen vehicle can be reported to an appropriate organization (for example, the police).

In addition, the present embodiment can be combined with Embodiment 2 or Embodiment 3.

In the above, the embodiments of the present invention have been described.

In order to enhance safety in the above-described embodiments, relays 107 to 110 are provided on both the positive electrode side and the negative electrode side of storage battery 106. However, the relays may be provided on only one of the positive electrode side and the negative electrode side of storage battery 106. This is because charge or discharge of storage battery 106 can be stopped by electrically disconnecting only one of the positive electrode side and the negative electrode side of storage battery 106.

Moreover, electric energy may be transferred between electric supply apparatus 20 and vehicle 10 by non-contacting charge through electromagnetic induction. That is, electric supply apparatus 20 may supply electric energy to vehicle 10 through electromagnetic induction non-contactingly with vehicle 10. In this case, electric supply plug 201 and lid portion 101 are unnecessary while PLC section 202 and PLC section 102 can be replaced with communication sections capable of wireless short distance communication.

The embodiments of the present invention described above are provided as hardware. The present invention can be achieved through software in cooperation with hardware, however.

The functional blocks described in the embodiments are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of Japanese Patent Application No. 2011-078238, filed on Mar. 31, 2011, including the specification, drawings and abstract, is incorporated herein by reference in its entirety.

INDUSTRIAL APPLICABILITY

The present invention is suitable for, for example, an electric supply apparatus supplying electric energy to a vehicle driven by electric energy accumulated in a storage battery.

REFERENCE SIGNS LIST

10 Vehicle
20 Electric supply apparatus
30 Server
201 Electric supply plug
202 PLC section
203 Server communication section
204 Electric power output section
205, 209 Selector switch
206 Control section
207 Power consumption section
208 Electricity storage section
210 Display section

The invention claimed is:

1. An electric supply apparatus that supplies electric energy to a vehicle from outside of the vehicle, the apparatus comprising:
an electric power output section that serves as a supply source of electric energy;
a reception section that receives electric energy from the vehicle;
a first communication section that communicates with the vehicle and acquires unique information from the vehicle, the unique information being stored in the vehicle and uniquely identifying the vehicle;
a second communication section that communicates with a server configured to check the unique information against stolen-vehicle information and that acquires a checking result from the server; and
a control section that supplies electric energy from the electric power output section to the vehicle when the unique information does not coincide with any piece of the stolen-vehicle information in the checking result, and
when the unique information coincides with any one piece of the stolen-vehicle information in the checking result, the control section discharges electric energy accumulated in a storage battery included in the vehicle, from the storage battery, and causes the reception section to receive the electric energy, wherein
the reception section includes:
a consumption section that receives from the vehicle and consumes electric discharge energy discharged from the storage battery included in the vehicle; and
an electricity storage section that receives from the vehicle and accumulates the electric discharge energy; and
the control section causes the electricity storage section included in the reception section to accumulate the electric discharge energy when a state of charge of the electricity storage section included in the reception section is smaller than a threshold; and
the control section causes the consumption section to consume the electric discharge energy when the state of charge of the electricity storage section included in the reception section is equal to or more than the threshold.

2. The electric supply apparatus according to claim 1, wherein:
the electric supply apparatus supplies electric energy to the vehicle through an electric power supply line; and
the first communication section performs power line communication with the vehicle through the electric power supply line.

3. The electric supply apparatus according to claim 1, wherein:
the electric supply apparatus supplies electric energy to the vehicle through electromagnetic induction without contacting the vehicle; and
the first communication section performs wireless short distance communication with the vehicle.

4. The electric supply apparatus according to claim 1, wherein the second communication section causes the server to store, in association with the unique information, the amount of the electric discharge energy accumulated in the electricity storage section.

5. The electric supply apparatus according to claim 1, wherein the control section makes a pseudo indication that electric energy is accumulated in the storage battery, when the unique information coincides with any one piece of the stolen-vehicle information.

6. The electric supply apparatus according to claim 5, wherein the control section reports, to the server, that electric energy accumulated in the storage battery is discharged from the storage battery.

7. The electric supply apparatus according to claim 1, wherein
- the control section measures the amount of electric discharge energy accumulated from the vehicle in the electricity storage section, and
- when the registered owner of the vehicle charges the vehicle that was a stolen vehicle and has been returned to the owner, the electric supply apparatus returns the amount of the electric discharge energy accumulated from the vehicle in the electricity storage section to the owner.

* * * * *